(No Model.)

G. C. LUMLEY.
THILL COUPLING.

No. 420,514. Patented Feb. 4, 1890.

WITNESSES:
Joseph Ball
Guernsey A. Hallowell

INVENTOR
George C. Lumley
Henry Price Ball
atty.

United States Patent Office.

GEORGE C. LUMLEY, OF PHILADELPHIA, PENNSYLVANIA.

THILL-COUPLING.

SPECIFICATION forming part of Letters Patent No. 420,514, dated February 4, 1890.

Application filed October 26, 1889. Serial No. 328,313. (No model.)

*To all whom it may concern:*

Be it known that I, GEORGE C. LUMLEY, a citizen of the United States, residing at Philadelphia, in the State of Pennsylvania, have invented a new and useful Coupling for Attaching Shafts and Poles to Wagons and Carriages, of which the following is a specification.

My invention relates to the eyes which are used to connect or attach the shafts or poles to the axles of wagons and carriages; and the objects of my improvement are to provide an eye which is absolutely free from wear, and therefore does not shake and rattle and necessitate repairs; second, to provide an eye which can be attached to any wagon already built without changing any of its construction, and, thirdly, to provide a coupling which does not endanger life or limb by breaking. I attain these objects by the mechanism illustrated in the accompanying drawings, in which—

Figure 1:
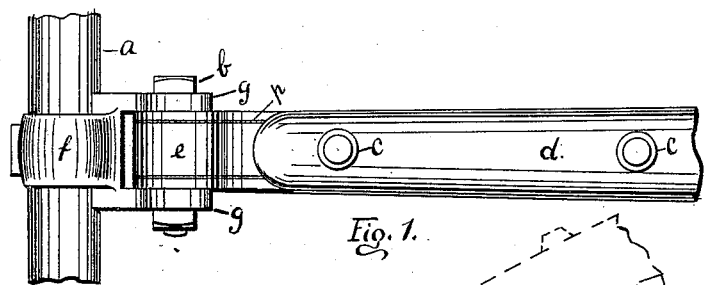
Figure 2:
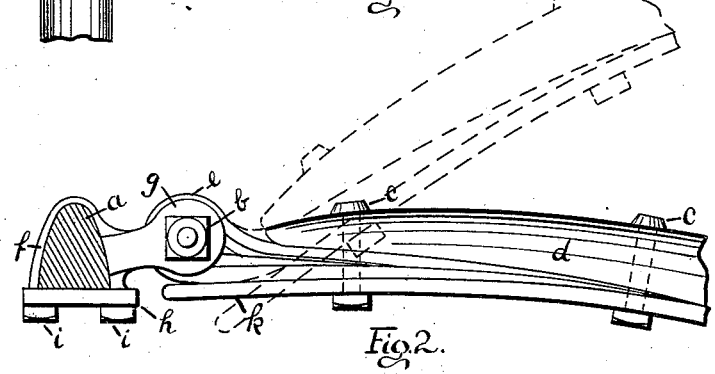
Figure 3:
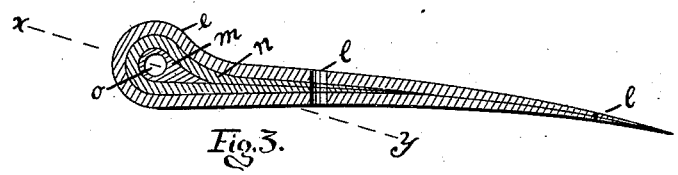
Figure 4:
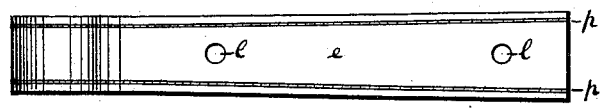
Figure 5:
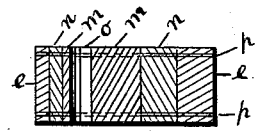

Figure 1 represents a plan view of my invention connecting the shaft and axle. Fig. 2 is a side view of Fig. 1, looking from the bottom. Fig. 3 is a sectional view of the eye through the center. Fig. 4 is a view of Fig. 3, looking from the top. Fig. 5 is a sectional view through the line $x\ y$, Fig. 3.

The same letters refer to the same parts throughout the various views.

A represents the axle of a wagon, on which is clamped the box or clip $f$, which clip is connected with the shaft of the wagon $d$ by means of the eye $e$ and bolt $b$. Heretofore the common mode of connecting the shaft and axle of wagons is to have an eye forged on the end of the shaft-iron $k$, which eye is held in the axle-clip or shaft-box $f$ by a bolt $b$ running through the clip-lugs $g\ g$ and the eye on the shaft-iron, thus forming a bearing which soon becomes loose and rattles and soon necessitates putting in new eyes and clips. Now I overcome these disadvantages by making an eye of one or more strips of leather, or any other pliable or flexible material $n$ and $e$, which are formed into the shape of an eye over a metal bushing $m$, which bushing has a projection on the side which fits into the joint of the pliable and flexible material where the strips of leather come together after passing around said bushing, thus preventing the bushing from turning in the leather and the leather from wearing away, and also making a bearing for the lugs $g$ and $g$ to bear against when the bolt $b$ is screwed up tight. Thus the said material is not crushed in the bearing, and yet is securely held, so that the leather does not turn on the bolt $b$ or on the bushing $m$, but gives or bends when necessary to adjust the strain or change in position of the shafts. It is seen from the drawings that this eye can be applied to any wagon by simply taking out the bolts $c\ c$ and inserting the leather eye $e$, which has a long tapering end, between the shaft end $d$ and shaft-iron $k$, and then screwing or bolting the shaft end, the eye, and shaft-iron securely together by the bolts $c\ c$, the eye being provided with holes $l\ l$ for the reception of the bolts $c\ c$. This eye is preferably made of two or more strips of leather, which are stitched together, as at $p\ p$, which prevents the leather from stretching out of shape, and prevents the bushing $m$ getting loose in the leather.

In applying this invention to a wagon already built it is not necessary to remove or cut the eye off the end of the shaft-iron, as the improved eye will operate above the iron eye when it is attached.

The principle on which my invention depends is that the said material and bushing, being held securely in the clip $f\ g\ g$ and not turning in any bearing whatever, there is absolutely no wear, and hence no renewing of iron eyes or clips, and hence no cost for repairs, the said flexible material giving to all motions of the shafts, no matter in what position, hence making it a direct pull on the wagon without any jarring or rattling.

The dotted portion of Fig. 2 shows the position of the shaft when in use, showing how the shaft-iron $k$ will take the strain from the flexible eye when in backing the wagon or carriage, the shaft-iron finding a bearing against the ring of the eye, and hence putting the strain against the bolt and taking the strain from the flexible material of which the eye is made. A square bolt can replace the ordinary bolt, and hence prevent all turning of the eye on the bolt or in the clip by its shape, whereas when a round bolt is used the eye is prevented from turning on it by the pressure of the lugs $g$ $g$ on each side of the eye.

Such material as leather, rubber, woven wire, canvas, or any other material of a flexible nature can be used to form the eye, the preference being given to leather.

Having fully described my invention, so that any one skilled in the art could make the same, what I claim as new, and wish to secure by Letters Patent, is—

The shaft-eye $e$, made by wrapping one or more strips of flexible material over a metal bushing $m$, the bushing $m$ having a projection running along its length, as and for the purpose specified.

GEORGE C. LUMLEY.

Witnesses:
HENRY PRICE BALL,
JOSEPH BALL.